(12) United States Patent
Kusamoto et al.

(10) Patent No.: US 7,731,007 B2
(45) Date of Patent: Jun. 8, 2010

(54) PARKING LOCK MECHANISM OF AUTOMATIC TRANSMISSION

(75) Inventors: Daisuke Kusamoto, Nagoya (JP); Yuji Yasuda, Nishikamo-gun (JP); Terufumi Miyazaki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 392 days.

(21) Appl. No.: 11/501,901

(22) Filed: Aug. 10, 2006

(65) Prior Publication Data

US 2007/0062780 A1    Mar. 22, 2007

(30) Foreign Application Priority Data

Sep. 21, 2005    (JP) .............................. 2005-274306

(51) Int. Cl.
*F16H 63/34* (2006.01)
(52) U.S. Cl. .................... 192/219.5; 74/411.5
(58) Field of Classification Search ............... 192/219.5
See application file for complete search history.

(56) References Cited

U.S. PATENT DOCUMENTS

| | | | |
|---|---|---|---|
| 3,213,968 A * | 10/1965 | Platz ........................... | 188/69 |
| 3,703,941 A * | 11/1972 | Ohie et al. ............... | 192/219.5 |
| 4,606,242 A | 8/1986 | Hasegawa et al. | |
| 4,610,336 A * | 9/1986 | Kuwayama et al. ...... | 192/219.5 |
| 4,671,133 A | 6/1987 | Yamada et al. | |
| 4,727,967 A * | 3/1988 | Ogasawara et al. ...... | 192/219.5 |
| 6,300,868 B1 * | 10/2001 | Barr ........................... | 340/457 |
| 2005/0101428 A1 * | 5/2005 | Allen et al. .................. | 475/221 |

FOREIGN PATENT DOCUMENTS

| | | |
|---|---|---|
| JP | 62-121158 | 7/1987 |
| JP | 7-10614 | 2/1995 |
| JP | 11-108183 | 4/1999 |
| JP | 2003-106453 | 4/2003 |
| JP | 2003-276580 | 10/2003 |

\* cited by examiner

*Primary Examiner*—Rodney H Bonck
(74) *Attorney, Agent, or Firm*—Oblon, Spivak, McClelland, Maier & Neustadt, L.L.P.

(57) ABSTRACT

A parking lock mechanism of an automatic transmission includes a casing, a parking gear provided in the casing, a parking pawl engaged with the parking gear to achieve a parking lock state, and a "parking pawl holding portion" suppressing inclination of the parking pawl in an out-of-plane direction (a direction shown with an arrow DR40). A groove portion is formed in the casing. A protruding portion is provided in a sleeve fixed to the casing. A side surface of the groove portion implements a "first portion" of the "parking pawl holding portion." A base and protruding portion are formed from a member separate from the casing, and implement a "second portion" of the "parking pawl holding portion."

14 Claims, 4 Drawing Sheets

PARKING LOCK MECHANISM OF AUTOMATIC TRANSMISSION

This nonprovisional application is based on Japanese Patent Application No. 2005-274306 filed with the Japan Patent Office on Sep. 21, 2005, the entire contents of which are hereby incorporated by reference.

FIELD OF THE INVENTION

The present invention relates to a parking lock mechanism of an automatic transmission, and more particularly to a parking lock mechanism of an automatic transmission having a parking pawl holding portion suppressing inclination of a parking pawl in an out-of-plane direction.

DESCRIPTION OF THE BACKGROUND ART

A parking lock mechanism of an automatic transmission has conventionally been known.

For example, Japanese Patent Laying-Open No. 2003-106453 discloses a parking lock mechanism of an automatic transmission pivotably supporting a parking pawl using a parking pawl shaft.

The parking lock mechanism as described above is provided in a casing such as a transmission case.

In the parking lock mechanism as described above, the parking pawl is engaged with a parking gear connected to an output shaft of the automatic transmission, so as to achieve a parking lock state. In order to move the parking pawl toward the parking gear, a sliding portion guiding the parking pawl is provided.

If the sliding portion is small, however, accuracy in holding the parking pawl is lowered and malfunction of the parking lock mechanism may occur.

If the sliding portion is implemented solely by the casing of the parking lock mechanism, a size of a portion guiding the parking pawl should be large to some extent, from a viewpoint of prevention of malfunction of the parking lock mechanism. In such a case, an area to be worked in the casing is increased, which results in an increased working time and shorter life of a tool. If the sliding portion is implemented solely by the casing in this manner, it is difficult to achieve both accuracy in holding the parking pawl and productivity of the parking lock mechanism.

SUMMARY OF THE INVENTION

An object of the present invention is to provide a parking lock mechanism of an automatic transmission achieving improved productivity while ensuring accuracy in holding a parking pawl.

A parking lock mechanism of an automatic transmission according to the present invention includes: a casing; a parking gear provided within the casing; a parking pawl engaged with the parking gear to achieve a parking lock state; and a parking pawl holding portion suppressing inclination of the parking pawl in an out-of-plane direction. The parking pawl holding portion is implemented by at least two members.

According to the structure above, two or more members implement the parking pawl holding portion, so that an area to be worked and the working time of the casing for forming the parking pawl holding portion can be decreased. Therefore, productivity can be improved while ensuring accuracy in holding the parking pawl.

Here, the "out-of-plane direction of the parking pawl" refers to a direction orthogonal to directions in which the parking pawl extends and pivots.

In the parking lock mechanism of the automatic transmission, the parking pawl holding portion includes a portion implemented by a side surface of a groove portion formed in the casing. The parking lock mechanism of the automatic transmission further includes a pivot support portion supporting the parking pawl in a manner pivotable with respect to the casing, and a base provided at a position distant from the pivot support portion and allowing projection of the side surface of the groove portion in a direction of depth thereof, in a part of the groove portion in a longitudinal direction.

According to the structure above, sliding resistance between the parking pawl and the side surface of the groove portion can be lowered, while ensuring accuracy in holding the parking pawl.

Preferably, the parking lock mechanism of the automatic transmission further includes a parking rod pressing the parking pawl against the parking gear while moving in an axial direction, and a sleeve member having an inclined surface that extends in a direction intersecting the axial direction of the parking rod and slides with respect to the parking rod moving in the axial direction. The parking pawl holding portion includes a protruding portion protruding from the sleeve member.

According to the structure above, the inclined surface on which relatively large load is imposed is formed from a member separate from the casing, so that lowering in durability of the casing is suppressed and the inclined surface can be formed with high accuracy. As the parking pawl holding portion includes the protruding portion protruding from the sleeve member, accuracy in holding the parking pawl can be improved without increasing the number of parts.

According to the present invention, productivity of the parking lock mechanism can be improved while ensuring accuracy in holding the parking pawl as described above.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
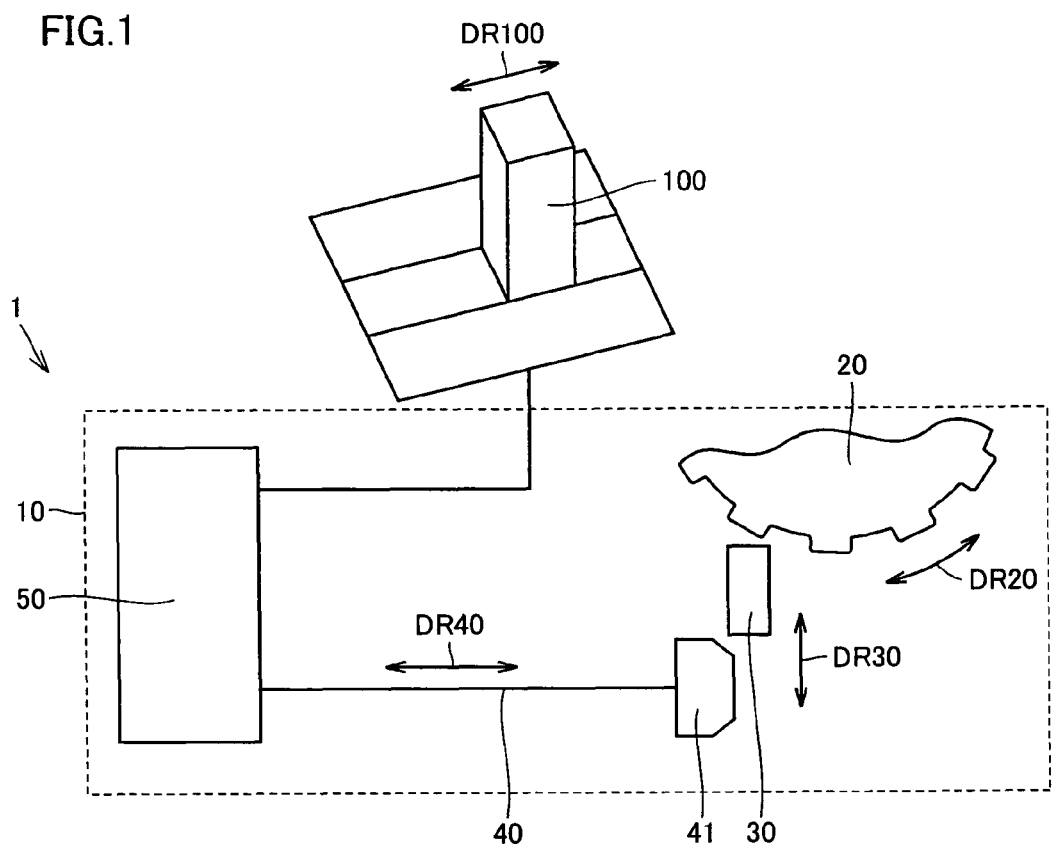
FIG. 1 shows a structure of a parking lock mechanism of an automatic transmission according to one embodiment of the present invention.

An embodiment of a parking lock mechanism according to the present invention will be described hereinafter. The same or corresponding elements have the same reference characters allotted, and detailed description thereof may not be repeated.

FIG. 1 shows a structure of a parking lock mechanism of an automatic transmission according to one embodiment of the present invention. Referring to FIG. 1, a parking lock mechanism 1 includes a parking gear 20 provided in a casing 10 (such as a transmission case), a parking pawl 30, a parking rod 40, and a transmission mechanism 50.

Parking gear 20 is connected to an output shaft of a powertrain of a vehicle and rotates in a direction of arrow DR20 when the vehicle runs. When parking gear 20 is engaged with parking pawl 30, the output shaft connected to a drive shaft of the vehicle is fixed. A parking lock state is thus achieved.

Parking rod 40 is connected to a selector lever 100 selecting a gear shift state through transmission mechanism 50. When selector lever 100 is moved in a direction of arrow DR100, a parking position, a reverse position, a neutral position, or a forward drive position is selected. When the parking position is selected by means of selector lever 100, parking rod 40 moves in a direction of arrow DR40. Then, a cam 41 provided in parking rod 40 moves parking pawl 30 in a direction of arrow DR30. Namely, parking pawl 30 is pressed against parking gear 20. Parking pawl 30 and parking gear 20 are thus engaged with each other.

Figure 2:
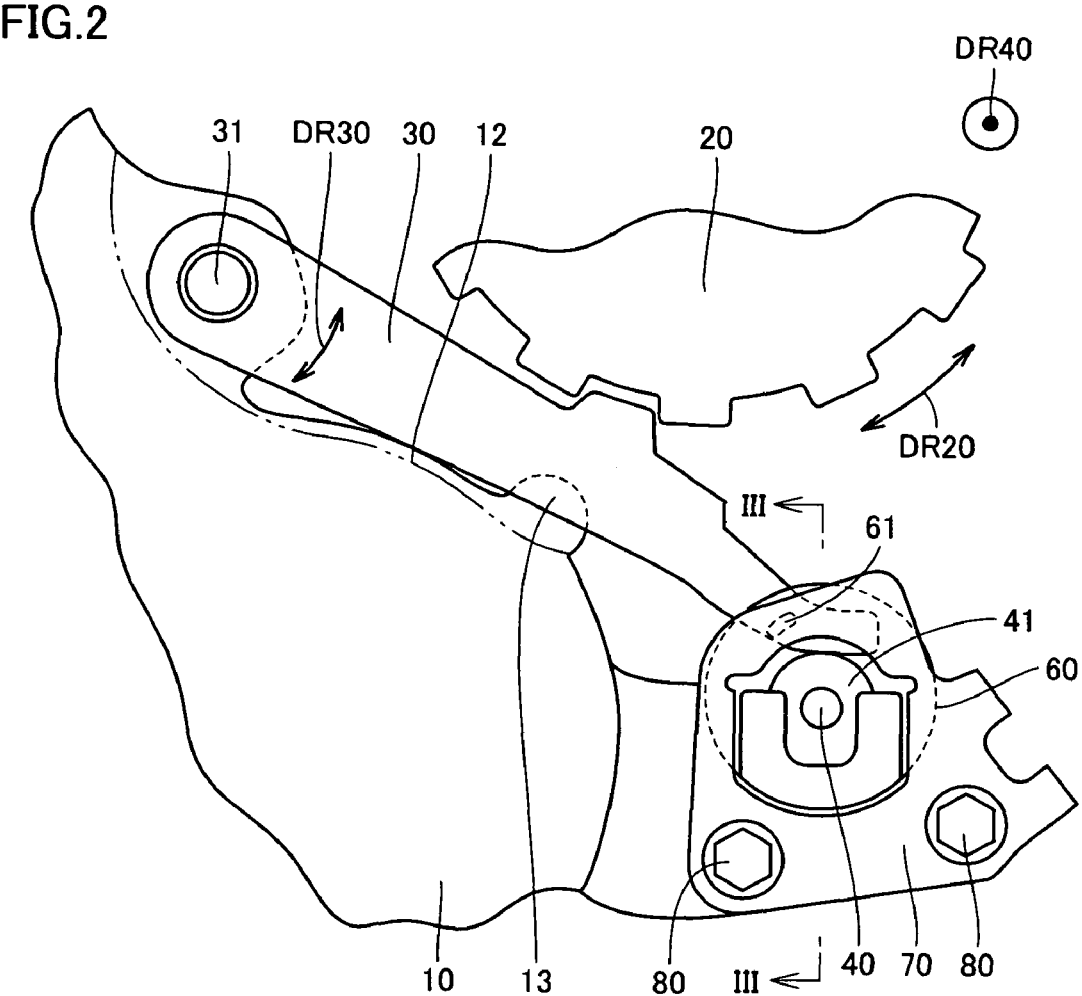
FIG. 2 shows the parking lock mechanism shown in FIG. 1 in further detail.

FIG. 2 shows the parking lock mechanism shown in FIG. 1 in further detail. As shown in FIG. 2, a pivot support portion 31 is provided on one end side of parking pawl 30. Parking pawl 30 is supported by pivot support portion 31 in a manner pivotable with respect to casing 10 in a direction of arrow DR30. The other end side of parking pawl 30 is in contact with cam 41 provided in parking rod 40. Cam 41 is in contact with a sleeve 60. A protruding portion 61 protruding from the front to the rear of the sheet showing FIG. 2 is provided in sleeve 60. Protruding portion 61 comes in contact with parking pawl 30. Sleeve 60 is fixed to casing 10 by a retainer plate 70 and a bolt 80.

A groove portion 12 and a base 13 are provided in casing 10. Base 13 supports parking pawl 30 from the rear toward the front of the sheet showing FIG. 2. On the other hand, protruding portion 61 provided in sleeve 60 supports parking pawl 30 from the front to the rear of the sheet showing FIG. 2. Inclination of parking pawl 30 in direction of arrow DR40 is thus suppressed.

Figure 3:
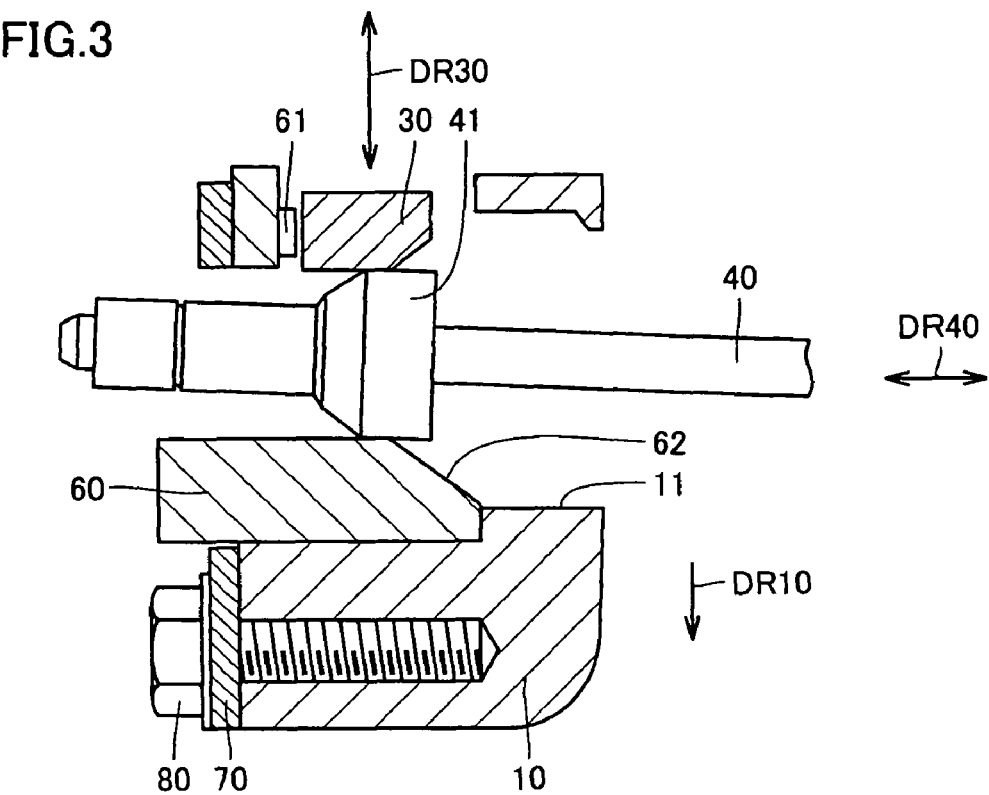
FIG. 3 is a cross-sectional view along the line III-III in FIG. 2.

FIG. 3 is a cross-sectional view along the line III-III in FIG. 2. Referring to FIG. 3, a guide portion 11 along the axial direction (direction of arrow DR40) of parking rod 40 is formed in casing 10. Guide portion 11 guides movement of cam 41 in a direction of arrow DR40 when a parking lock operation is performed, so that parking rod 40 can smoothly move. Sleeve 60 is fitted in a hole provided in casing 10. Here, sleeve 60 is provided at a position adjacent to guide portion 11 in casing 10. Sleeve 60 has an inclined surface 62 at a position adjacent to guide portion 11. Inclined surface 62 extends in a direction inclined obliquely with respect to the axial direction of parking rod 40. When the parking lock operation is performed, cam 41 that has passed over guide portion 11 slides with respect to inclined surface 62, so that cam 41 moves toward parking pawl 30 and presses parking pawl 30. Consequently, parking pawl 30 pivots in a direction of arrow DR30, and parking pawl 30 is engaged with parking gear 20. As shown in FIG. 3, movement of sleeve 60 in a direction of arrow DR40 is restricted by retainer plate 70 and bolt 80.

In the following, a mechanism supporting parking pawl 30 will be described in further detail.

Figure 4:
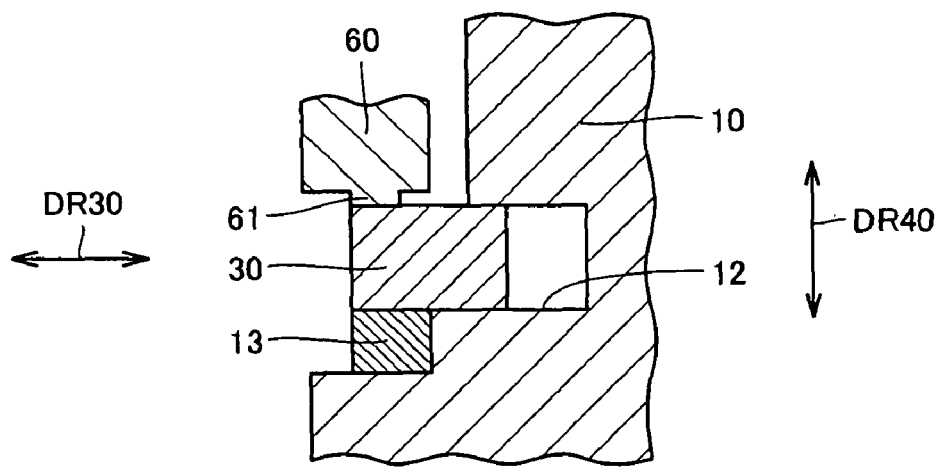
FIG. 4 is a first diagram illustrating an operation state of the parking lock mechanism.
Figure 5:
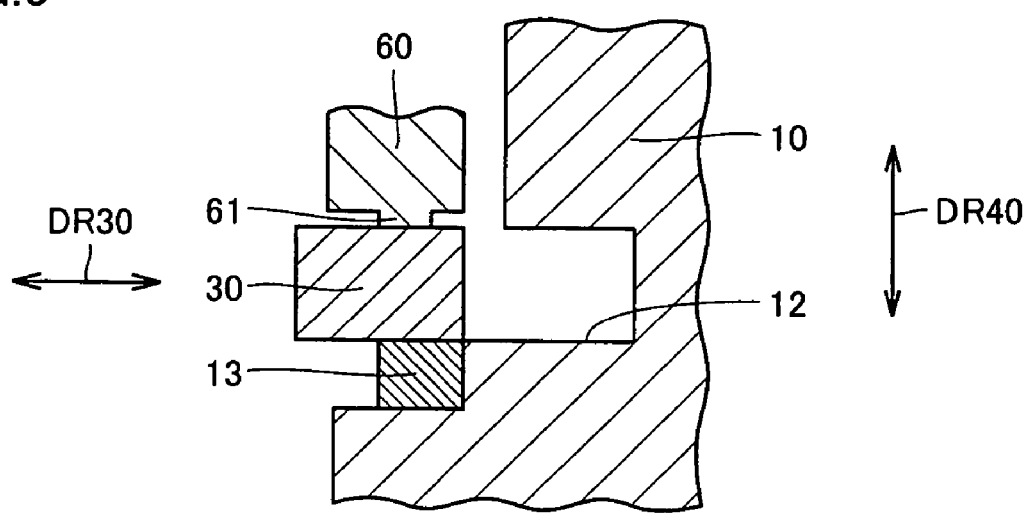
FIG. 5 is a second diagram illustrating an operation state of the parking lock mechanism.

FIGS. 4 and 5 illustrate an operation state of the parking lock mechanism. FIG. 4 shows a state in which a position other than the parking position (here, a reverse position) is set, while FIG. 5 shows a state in which the parking position is set.

In the state shown in FIG. 4, a part of parking pawl 30 is accommodated in groove portion 12. In addition, a portion of parking pawl 30 protruding outside groove portion 12 is sandwiched between base 13 and protruding portion 61. On the other hand, in a state shown in FIG. 5, parking pawl 30 is located outside groove portion 12 and sandwiched between base 13 and protruding portion 61 of sleeve 60. In this manner, when parking pawl 30 is located outside groove portion 12 as well, inclination of parking pawl 30 in a direction of arrow DR40 can be suppressed by means of base 13 and protruding portion 61. It is noted that a part of parking pawl 30 may be located within groove portion 12 also when the parking position is set.

According to the structure above, as compared with an example in which inclination of parking pawl 30 is suppressed solely by the side surface of groove portion 12, groove portion 12 can be shallower. Consequently, an area to be worked and a working time of casing 10 can be decreased, and productivity of parking lock mechanism 1 can be improved while ensuring accuracy in holding parking pawl 30. In addition, if groove portion 12 is shallower, casing 10 can be reduced in size. Therefore, the weight of parking lock mechanism 1 can also be decreased. Moreover, as base 13 and protruding portion 61 are locally present in a longitudinal direction of parking pawl 30, a sliding area between parking pawl 30 and the support member is reduced and sliding resistance when parking pawl 30 pivots is lowered.

In the present embodiment, sleeve 60 is formed, for example, from an iron-based sintered metal. Cam 41 is manufactured, for example, through cutting process of an iron-based material, while parking pawl 30 is manufactured, for example, through high-precision press working of an iron-based material.

Summarizing the description above, parking lock mechanism 1 of the automatic transmission according to the present embodiment includes casing 10, parking gear 20 provided in casing 10, parking pawl 30 engaged with parking gear 20 to achieve a parking lock state, and groove portion 12, base 13 and protruding portion 61 serving as the "parking pawl holding portion" suppressing inclination of parking pawl 30 in the out-of-plane direction (direction shown with arrow DR40). Groove portion 12 is formed in casing 10. The side surface of groove portion 12 implements the "first portion" of the "parking pawl holding portion." Base 13 and protruding portion 61 are formed from a member separate from casing 10 (such as sleeve 60), and implement the "second portion" of the "parking pawl holding portion."

According to the structure above, the "parking pawl holding portion" is formed from a member separate from casing 10, so that the area to be worked and the working time of casing 10 for forming the "parking pawl holding portion" can be decreased. Therefore, productivity can be improved while ensuring accuracy in holding parking pawl 30.

Base 13 is typically implemented by a member separate from casing 10, however, it may be implemented by casing 10.

Parking lock mechanism 1 further includes pivot support portion 31 supporting parking pawl 30 in a manner pivotable with respect to casing 10. Base 13 is provided at a position distant from pivot support portion 31, and allows projection of the side surface of groove portion 12 in a direction of depth thereof, in a part of groove portion 12 in a longitudinal direction.

According to the structure above, sliding resistance between parking pawl 30 and the side surface of groove portion 12 can be lowered, while ensuring accuracy in holding parking pawl 30.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A parking lock mechanism of an automatic transmission, comprising:
   a casing;
   a parking gear provided within said casing;
   a parking pawl pivotally mounted in said casing at a pivot support portion such that the parking pawl pivots in an engagement plane, the parking pawl including an engagement portion that engages with said parking gear to achieve a parking lock state; and
   a parking pawl holding portion that suppresses movement of said parking pawl in a direction perpendicular to said engagement plane;
   wherein said parking pawl holding portion includes opposing side surfaces of a groove portion of the casing, a base member separately provided from the casing, and a protruding portion of a sleeve member,
   wherein said pivot support portion pivotally supports said parking pawl with respect to said casing and said base member,
   wherein said base member is provided at a position distant from said pivot support portion and distant from said protruding portion of the sleeve member, such that the base member extends from the casing substantially parallel to the engagement plane in a direction towards the engagement portion,
   wherein said opposing side surfaces, said base member, and said protruding portion suppress said movement of said parking pawl in said direction perpendicular to said engagement plane when said parking lock mechanism is not in said parking lock state, and
   wherein said base member and said protruding portion suppress said movement of said parking pawl in said direction perpendicular to said engagement plane when said parking lock mechanism is in said parking lock state.

2. The parking lock mechanism of an automatic transmission according to claim 1, wherein the base member extends from one of said opposing sides surfaces of said groove portion.

3. The parking lock mechanism of an automatic transmission according to claim 1, further comprising:
   a parking rod that presses said parking pawl against said parking gear when moved in an axial direction; and
   wherein said sleeve member includes an inclined surface that extends in a direction intersecting the axial direction of said parking rod such that said parking rod slides along said inclined surface when said parking rod moves in said axial direction.

4. The parking lock mechanism of an automatic transmission according to claim 3,
   wherein a rear portion of the sleeve member is a portion farthest from the inclined surface in the axial direction of the parking rod, and
   wherein the sleeve member is provided in a hole formed in the casing and restricted in the axial direction of the parking rod by a retainer plate and a bolt, located at said rear portion of the sleeve member.

5. The parking lock mechanism of an automatic transmission according to claim 4, wherein the protruding portion extends from the rear portion of the sleeve member toward the parking pawl in a direction parallel to the axial direction of the parking rod.

6. The parking lock mechanism of an automatic transmission according to claim 1,
   wherein the groove portion extends between the pivot support portion and the sleeve member, and
   wherein the groove portion has a width in the direction perpendicular to the engagement plane that is greater than a width of the parking pawl.

7. The parking lock mechanism of an automatic transmission according to claim 1, wherein the base member is provided between the pivot support portion and the sleeve member.

8. A parking lock mechanism of an automatic transmission, comprising:
   a casing;
   a parking gear provided within said casing;
   a parking pawl pivotally mounted in said casing such that the parking pawl pivots in an engagement plane, wherein the parking pawl engages with said parking gear to achieve a parking lock state; and
   a parking pawl holding portion that suppresses movement of said parking pawl in a direction perpendicular to said engagement plane;
   wherein said parking pawl holding portion includes opposing side surfaces of a groove portion of the casing, a base member, and a protruding portion of a sleeve member,
   wherein said opposing side surfaces, said base member, and said protruding portion suppress said movement of said parking pawl in said direction perpendicular to said engagement plane when said parking lock mechanism is not in said parking lock state,
   wherein said base member and said protruding portion suppress said movement of said parking pawl in said direction perpendicular to said engagement plane when said parking lock mechanism is in said parking lock state, and
   wherein said opposing side surfaces do not suppress said movement of said parking pawl in said direction perpendicular to said engagement plane when said parking lock mechanism is in said parking lock state.

9. The parking lock mechanism of an automatic transmission according to claim 8, wherein the base member extends from one of said opposing sides surfaces of said groove portion in a direction parallel to said engagement plane.

10. The parking lock mechanism of an automatic transmission according to claim 8, further comprising:
    a parking rod that presses said parking pawl against said parking gear when moved in an axial direction; and
    wherein said sleeve member includes an inclined surface that extends in a direction intersecting the axial direction of said parking rod such that said parking rod slides along said inclined surface when said parking rod moves in said axial direction.

11. The parking lock mechanism of an automatic transmission according to claim 10,
    wherein a rear portion of the sleeve member is a portion farthest from the inclined surface in the axial direction of the parking rod, and
    wherein the sleeve member is provided in a hole formed in the casing and restricted in the axial direction of the parking rod by a retainer plate and a bolt, located at said rear portion of the sleeve member.

12. The parking lock mechanism of an automatic transmission according to claim 11, wherein the protruding portion extends from the rear portion of the sleeve member toward the parking pawl in a direction parallel to the axial direction of the parking rod.

13. The parking lock mechanism of an automatic transmission according to claim 8, wherein the base member is not integrally formed with the casing.

14. The parking lock mechanism of an automatic transmission according to claim 8,
   wherein the groove portion extends between a point at which the parking pawl is pivotally mounted and the sleeve member, and
   wherein the groove portion has a width in the direction perpendicular to the engagement plane that is greater than a width of the parking pawl.

* * * * *